United States Patent [19]

Frank

[11] Patent Number: 4,485,914

[45] Date of Patent: Dec. 4, 1984

[54] VARIABLE DRIVE PIN PROJECTION MECHANISM FOR A BELT SPROCKET DRIVE WHEEL

[75] Inventor: Vlastimil Frank, Warrenton, Va.

[73] Assignee: IBM Corporation, Armonk, N.Y.

[21] Appl. No.: 429,911

[22] Filed: Sep. 30, 1982

[51] Int. Cl.³ ............................................. B65G 23/06
[52] U.S. Cl. ..................................... 198/834; 226/75; 226/170
[58] Field of Search ....................... 226/74, 75, 81, 57, 226/58, 168–173; 198/394, 655, 715, 832–835; 474/152, 162, 163

[56] References Cited

U.S. PATENT DOCUMENTS

| | | | |
|---|---|---|---|
| 1,937,304 | 11/1933 | Worrall | 198/834 |
| 2,815,672 | 12/1957 | Storer | 226/81 |
| 3,312,325 | 4/1967 | Beck et al. | 198/394 |
| 3,738,315 | 6/1973 | Sweitzer | 198/656 |
| 4,257,519 | 3/1981 | Leach | 198/834 |

FOREIGN PATENT DOCUMENTS 2032584  4/1980  Fed. Rep. of Germany ...... 198/656

Primary Examiner—Leonard D. Christian
Attorney, Agent, or Firm—M. H. Klitzman

[57] ABSTRACT

A miniature variable drive pin projection mechanism is disclosed for driving a conveyer belt to transport semiconductor chips from a test point to a sequence of sorting locations. The drive wheel is mounted to an indexing shaft which is sequentially rotated in a start and stop mode. The wheel has spring-loaded pins which are radially mounted in the wheel and are spring-loaded so as to be withdrawn from the peripheral surface of the wheel. Drive means are provided to actuate the pins during only 60 degree rotation of the wheel. During the remainder of 300 degree rotation of the wheel, there is substantially frictionless engagement.

The resultant mechanism significantly reduces wear, vibration and misregistration of the assembly and lengthens its operating life.

14 Claims, 11 Drawing Figures

FIG. 1 SEMICONDUCTOR CHIP TESTING AND SORTING APPARATUS

FIG. 2

FIG. 3
SEE 3-3'

FIG. 4

FIG. 5
DRIVE PIN 8

FIG. 9
PLUNGER

FIG. 10
DETAIL "A"
OF FIG. 9

FIG. 11
GROOVE 31
FOR STATIONARY CAM 14 ved in the prior art to provide
VARIABLE DRIVE PIN PROJECTION MECHANISM FOR A BELT SPROCKET DRIVE WHEEL

FIELD OF THE ENVENTION

The invention disclosed broadly relates to conveyer mechanisms and more particularly relates to conveyer belts used in semiconductor chip handlers.

BACKGROUND OF THE INVENTION

Existing semiconductor chip handlers transfer chips from a test point to a sequence of sorting locations using a conveyer belt which is driven by a sprocket wheel. The conveyer belt is a web of stainless steel which has a linear sequence of sprocket holes along its edge, each of which is engaged by fixed pins or teeth on a sprocket drive wheel. The drive wheel is mounted to an indexing shaft which is sequentially rotated in a start and stop mode so that chips carried by the belt can be deposited at one or several locations designated for a tested chip. A quantity on the order of a million chips per day must be sequentially advanced along the conveyer belt by the sprocket wheel. A precise, indexed displacement is required to precisely position the tested chips to within 0.0005 inch of the location of each of a plurality of sorting stations. The application requires a precise indexing of the belt's position since cumulative errors can occur when the point of engagement of the pins with the holes in the belt is not precisely registered. When a pin does not accurately engage the hole in the belt, the belt can be lifted off the surface of the wheel tending to stretch the belt, enlarge the hole in the belt, and shorten the operating life of the belt. In addition, the cumulative effects of such pin misregistration can result in misfeeds, missorts, and damaged chips in the conveying operation.

Also, because of misalignment between the pins and holes, imprecise indexing between inspection stations takes place. For example, at one inch spacing intervals between the stations, the one inch dimension will become slightly greater when the belt is lifted by misaligned pins seeking to register with a misaligned opening. The arc resulting from the lifted belt introduces an additional error into the system.

These problems have been partially solved by providing a miniature variable drive pin projection mechanism so that the drive pins extend from the circumferential surface of the drive wheel only during a small portion of the 360 degree rotation of the wheel. Thus, the pins will not tend to misregister when they initially contact the belt surface.

However, the pins must have a 14 degree side taper in order to accommodate an approaching pin's extension into a belt hole and its retraction from a belt hole, in order to maintain a continuous contact between each pin's side surface and the inner surface of the respective sprocket hole in the belt. Since the pins are tapered, there is an optimum difference in the diameter between the top and the bottom of the pin. Thus, the pins must always extend at the same height above the circumferential surface of the wheel, when fully extended.

This raises still another problem since the high velocity in the start/stop operation of the wheel and the long duration of use in the semiconductor testing application, will impose great wear on the base of the pin when actuated by a radial cam surface as has been done in the prior art for other applications. Such wear will cause the height of the drive pin when fully extended, to diminish with time and thus cause the diameter of the tapered pin to be reduced at the point of contact with the sidewall of the sprocket hole in the conveyer belt. Excessive wear requires frequent replacement and long "down" time of the test equipment.

Attempts have been made in the prior art to provide variable projection pin sprocket drive wheels for conveyer belts. U.S. Pat. No. 2,102,651 to Sherman, et al., shows a radial cam for moving the drive pins 22 beyond the periphery of the member 18 through holes in the driven cylinder 10 as the member 18 is rotated. A similar disclosure is made in U.S. Pat. No. 2,842,247 to Euth which shows the use of a radial cam mechanism 31 for projecting pins outwardly beyond the periphery of the drive member into the drive holes of the driven member. U.S. Pat. No. 2,815,672 makes a similar disclosure of a radial cam. U.S. Pat. Nos. 4,022,365; 4,033,492; and 4,136,809 also show a radial cam for driving sprocket pins.

However none of these prior art approaches to variable projection pin sprocket drive wheels solves the problems of vibration and great wear on the base of the pin when actuated by the radial cam surface.

Further, the prior art variable drive pin projection mechanisms are not suitable for the space and size requirements of a miniature indexing mechanism utilized in conveying semiconductor chips at such small and precise dimensions.

OBJECTS OF THE INVENTION

It is therefore an object of the invention to provide a variable drive pin projection mechanism for engagement with a sprocket belt which has reduced wear characteristics.

It is a further object of the invention to provide an improved transport mechanism for semiconductor chips.

It is yet another object of the invention to subject the drive pins of a sprocket and belt assembly to wear during only a small portion of the cycle time.

SUMMARY OF THE INVENTION

These and other objects, features and advantages of the invention are accomplished by the miniature variable drive pin projection mechanism for a belt sprocket drive wheel disclosed herein. The invention significantly reduces the wear on the base of the drive pins as they are radially extended and withdrawn in the sprocket wheel. This is accomplished by the mechanism for driving the pins being in frictionless engagement for approximately 300 degrees rotation of the wheel, and frictional engagement for approximately 60 degrees. The mechanism includes a plurality of transverse plunger pins, each being slideably engaged in a respective transverse hole in the wheel body, which intersects a respective one of the radial pin holes in which a respective drive pin slides. Each transverse plunger has a cam surface which is operatively connected to the base of its respective drive pin, for outwardly radially displacing the drive pin by undergoing a displacement itself in the transverse direction when the corresponding drive pin reaches a drive position during the rotation of the wheel. In this manner, only a very small degree of rubbing action is applied to the base of the drive pin during each 360 degree rotation of the wheel. Thus, during 300 degree rotation of the wheel the drive pin and associated mechanism has substantially no frictional engagement taking place, and thus no wear. This significantly reduces the amount of wear on the drive pin. This is an important feature since any wear on the base of the drive pin will change its height and therefore the effective diameter of the tapered portion of the pin which engages the belt, thereby, once again, introducing misregistrations and slippages with respect to the belt hole.

The transverse plungers are actuated by a stationary cam which is mounted near the drive sprocket wheel, and has an actuating contour which is located in a position which corresponds with the drive position for the drive pins. A cam follower on each transverse plunger follows the actuating contour of the stationary cam during the rotation of the wheel, and displaces the respective transverse plunger in the transverse direction when the corresponding drive pin reaches the drive position. Here again, the parts are not in frictional engagement during approximately 300 degree rotation of the sprocket wheel.

Thus, the semiconductor chip conveyer has a significantly reduced damage rate for the chips and a significantly reduced maintenance time and repair time.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
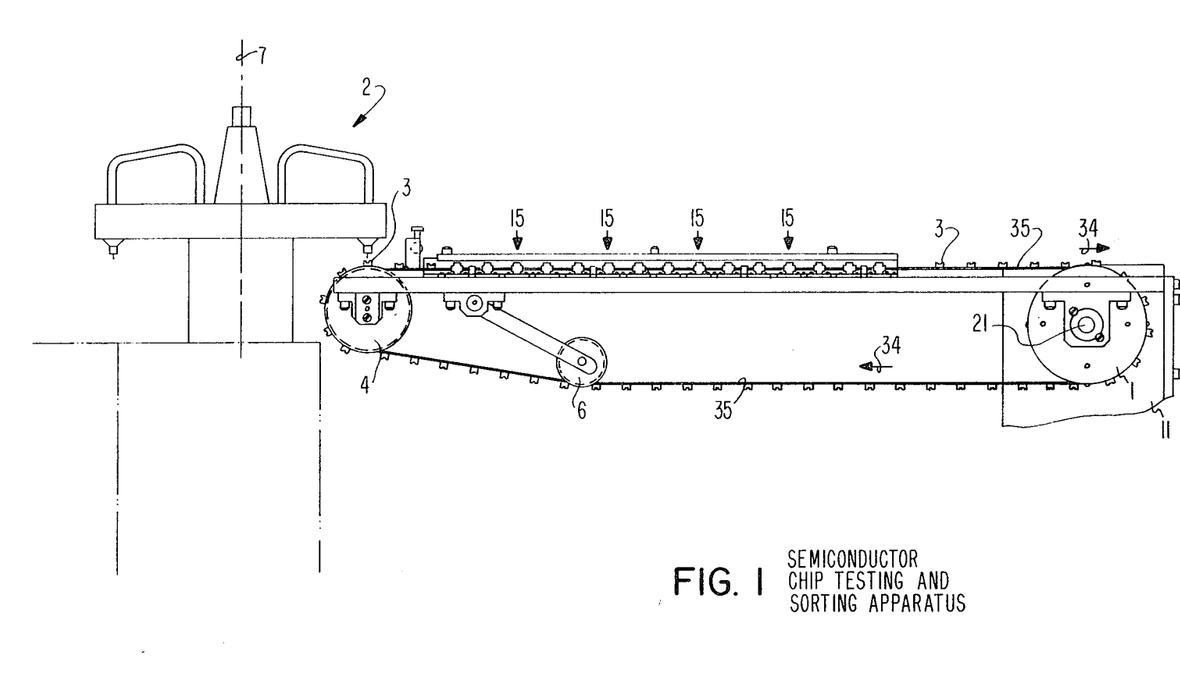
FIG. 1 is an overall view of a semiconductor chip testing and sorting apparatus employing the drive wheel invention, for transferring semiconductor chips from a test point to a sequence of sorting locations.

An overall view of the semiconductor chip testing and sorting apparatus which employs the drive wheel invention 1, is shown in FIG. 1. Semiconductor chips are sequentially picked up by vacuum pencils mounted on the rotary turret 2. The semiconductor chips are then positioned on the electrodes of a circuit tester where electrical testing operations are conducted. The semiconductor chip is then picked up by the vacuum pencil turret 2 which rotates about the axis 7, and each respective chip is dropped on one of a plurality of chip receptacles 3 which are mounted in sequence on the conveyer belt 35. The conveyer belt moves the tested chip to one of several sorting locations 15 where the chip will be removed from its receptacle on the belt in response to the outcome of the electrical test previously conducted on a chip. The belt is driven by the drive wheel invention 1 which is mounted on the drive shaft 21 which is sequentially indexed by means of a stepping motor mounted in the mounting base 11. The belt moves in the direction 34 over the driven wheel 4 and is maintained in its proper tension by means of the tensioning wheel 6. The chip receptacles 3 mounted on the stainless steel belt 35 are mutually separated by a distance of one inch. Each time the drive wheel 1 periodically stops a chip receptacle 3 adjacent to a sorting location 15, the receptacle 3 must be registered in its position with respect to the position of the sorting location to within a tolerance of ±0.0005 inches. The purpose of the drive wheel 1 is to maintain these stringent tolerances while providing a high throughput for chips conveyed.

Figure 2:
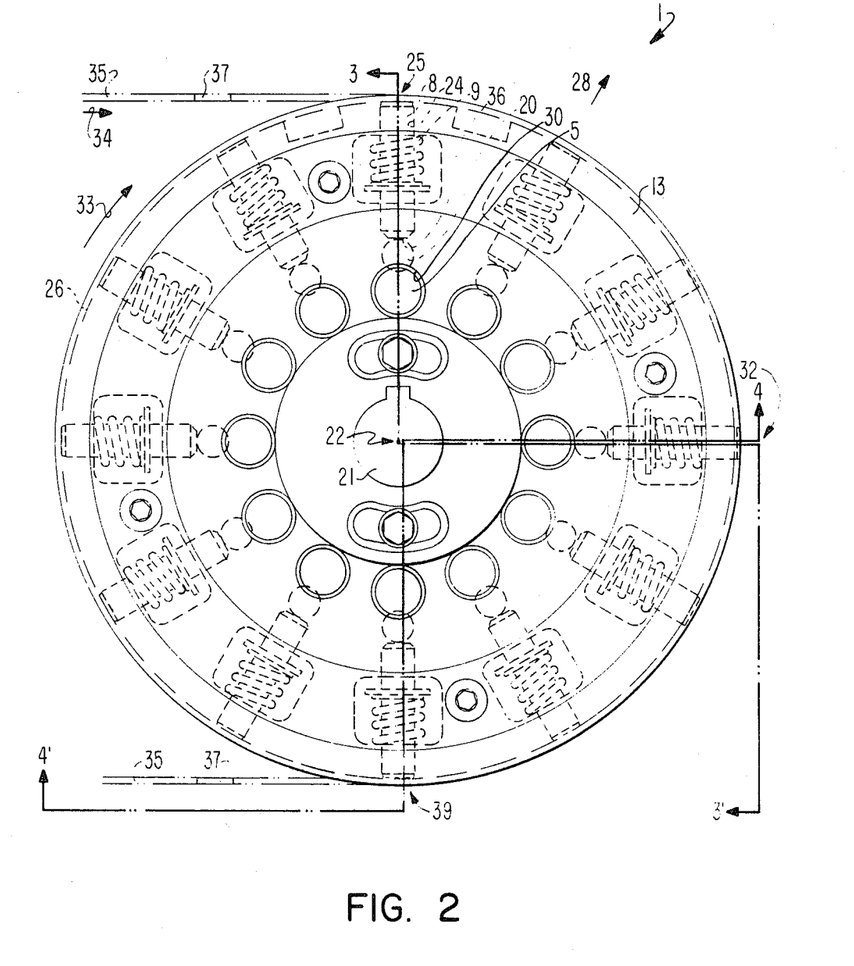
FIG. 2 is a front view of the drive wheel invention.
Figure 3:
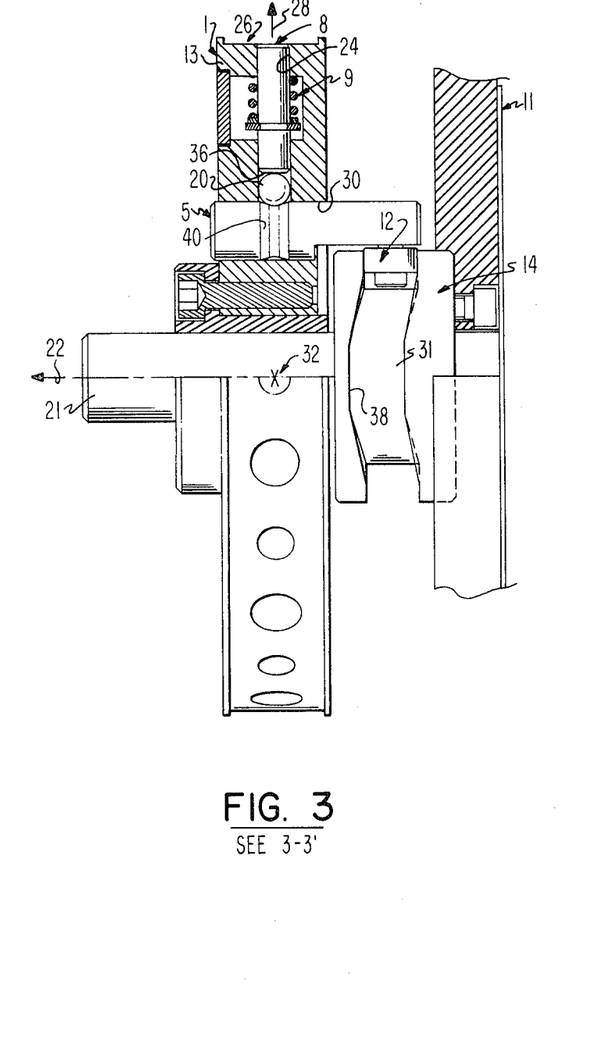
FIG. 3 is a side, partial cross-sectional view along the section line 3—3' of FIG. 2, showing the drive wheel invention.
Figure 4:
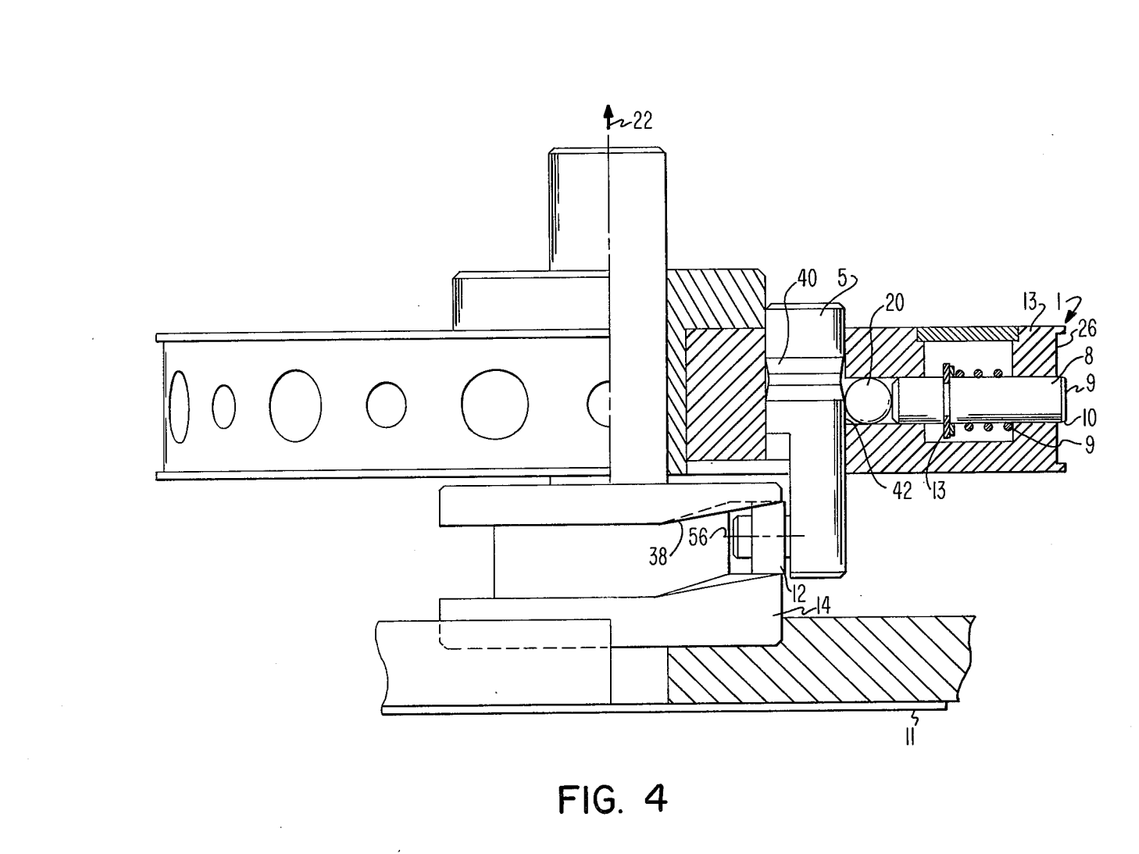
FIG. 4 is a bottom, partial cross-sectional view along the section line 4—4' of FIG. 2, showing the drive wheel invention.

A more detailed front view of the drive wheel invention 1 is shown in FIG. 2, which is supplemented by FIG. 3 showing a side cross-sectional view along the section line 3—3' of FIG. 2 and which is further supplemented by FIG. 4 which shows a bottom cross-sectional view along the section line 4—4' of FIG. 2. The circular wheel body 13 is mounted on the drive shaft 21 for rotation about the axis 22. The drive shaft 21 is sequentially indexed by means of an indexing motor mounted in the mounting base 11. A plurality of 12 radially oriented pin holes 24 are disposed about the wheel body 13, each opening onto the peripheral surface 26 of the wheel body 13, in the radial direction. A plurality of 12 transverse holes 30 are disposed in the axial direction 22 about the central axis 22 of the wheel body 13, each transverse hole intersecting a respective one of the radial pin holes 24, in the transverse direction 22.

A plurality of 12 drive pins 8 are arranged about the wheel body 13, each drive pin 8 slideably engaged in a respective one of the radial pin holes 24, so as to be capable of linear displacement in the radial direction 28. The purpose of the drive pins 8 is to engage respective ones of the sprocket holes 37 in the belt 35 as is shown to better advantage in FIGS. 6, 7 and 8. The drive pin 8 engages the hole 37 by outward radial displacement at the drive position 32, shown in FIG. 2. As is seen in FIG. 2, the belt 35 moves in the direction 34, driven by the drive wheel 1 rotating with the wheel motion direction 33. The point at the top of the wheel body 13 in FIG. 2 at which the belt 35 initially contacts the peripheral surface 26 of the wheel 13 is designated by the value of 0 degrees for the angle $\theta$.

This is the initial belt contact position 25. FIG. 2 shows the 12 radial pins 8 in the wheel body 13 located at angular positions which are multiples of 30 degrees in angular displacement from the initial belt contact position 25. As is seen in FIG. 2, the drive position 32 is at the 90 degree position on the right side of the wheel body 13 in FIG. 2. At the initial belt contact position 25, the radial pin 8 is completely retracted so that its surface is flush with the peripheral surface 26 of the wheel body 13. As a given radial pin 8 is moved angularly about the axis 22 toward the drive position 32, it is projected outwardly from the radial hole 24 and is fully projected when it arrives at the drive position 32, at which point it fully engages a corresponding sprocket hole 37 of the belt 35. When so engaged, the radial drive pin 8 transmits the torque from the drive shaft 21, through the wheel body 13, to the conveyer belt 35. As the wheel body 13 continues to move the radial pin 8 from the drive position 32 at an angle $\theta$ equal to 90 degrees toward the position 39 at an angle of 180 degrees, the pin 8 is retracted and it becomes fully retracted at the position 39, where the belt 35 leaves the surface 26 of the wheel body 13.

This projection and retraction motion for the radial pins 8 is imparted by the transverse plunger pins 5. A plurality of 12 transverse plunger pins 5 are disposed about the wheel body 13, each transverse plunger pin 5 slideably engaging a respective one of the transverse holes 30. Each transverse plunger pin 5 has a cam surface 40 as is shown in FIGS. 2 and 3. As the transverse plunger pin 5 is displaced transversely with respect to the wheel body 13, the cam surface 40 drives a ball bearing 20 in the outward radial direction against the base 36 of a corresponding one of the radial drive pins 8. In this manner, the radial drive pin 8 is outwardly displaced by the transverse displacement of the transverse plunger pin.

Each transverse plunger pin 5 has a cam follower 12 mounted at the axis 56 of the plunger pin. The cam follower 12 engages the groove 31 of the stationary cam 14 which is mounted to the mounting base 11. When a particular transverse plunger pin 5 and its radial drive pin 8 approach the drive position 32 at an angle θ of 90 degrees, the cam follower 12 riding in the groove 31 is driven in the transverse direction 22 by means of the actuating contour 38 of the groove 31. This transverse motion of the transverse plunger pin 5 as it approaches the drive position 32, forces the ball bearing 20 to ride up on the cam surface 40 of the transverse plunger pin 5, thereby forcing the radial drive pin 8 to be projected outwardly above the peripheral surface 26 of the wheel body 13. This is shown in the cross-sectional bottom view of FIG. 4.

As the wheel body 13 continues its rotary motion about the axis 22, moving the transverse plunger pin 5 and its radial drive pin 8 from the angular position at 90 degrees toward the angular position at 180 degrees in FIG. 2, the cam follower 12 riding in the groove 31 of the cam 14 pulls the transverse plunger 5 back to its original position as shown in FIG. 3. In this motion, the ball bearing 20 riding on the cam surface 40 of the transverse plunger pin 5 is forced downwardly by the spring force applied by the spring 9 to the radial drive pin 8. The radial drive pin 8 follows this motion and its upper surface 9 is retracted so as to become flush with the peripheral surface 26 of the wheel body 13 when the drive pin reaches the fully retracted position 39, shown in FIG. 2.

Figure 5:
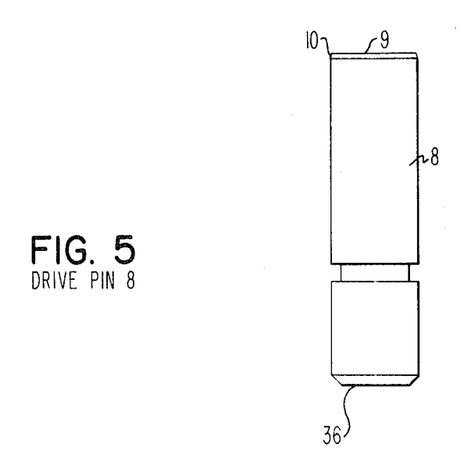
FIG. 5 is a more detailed view of the drive pin 8.
Figure 6:
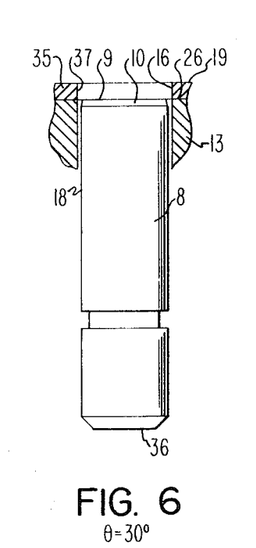
FIGS. 6, 7 and 8 is a sequence of illustrations showing the progressive position of the pin 8 relative to the belt 35 at the respective angular positions of 30 degrees, 60 degrees and 90 degrees for the drive wheel invention.
Figure 7:
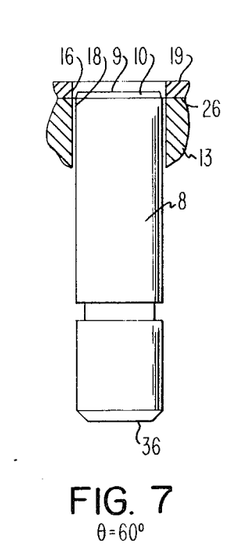
Figure 8:
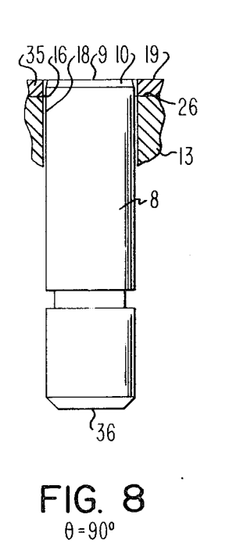

A more detailed illustration of the engagement of the radial pin 8 with the belt 35 is shown in FIGS. 6 through 8. The radial drive pin 8 has a bevel 10 with a taper angle of 14 degrees for example with respect to the cylindrical axis of the pin, as is shown in FIG. 5, in order to enable the pin to begin its insertion into the hole 37 of the belt 35.

As the position of the radial pin 8 progresses from the initial belt contact position 25 at θ equals 0 degrees, through the position at θ equals 30 degrees shown in FIG. 6, to the position at θ equals 60 degrees shown in FIG. 7, the radial pin is seen to be beginning its insertion into the hole 37 of the belt 35. By the time the position of the radial pin 8 reaches a value of θ equal to 90 degrees, as shown in FIG. 8, the radial pin 8 has completely traversed the thickness of the belt 35 so that the top surface 9 of the pin 8 becomes flush with the top 19 of the belt 35. As can be seen from the sequence of FIGS. 6 through 8, the bevel 10 enables the upward motion of the radial pin 8 to adjust the relative transverse position of the pin with respect to the sidewall 16 of the hole 37 by applying pressure from the bevel 10 to the sidewall 16, thereby providing any readjustment in the position of the belt on the peripheral surface 26 of the wheel 13. In this manner, the belt 35 is continuously maintained in proper registration with respect to the radial pins 8.

Figure 9:
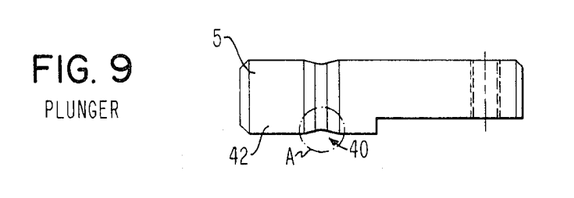
FIG. 9 is a detailed view of the plunger pin 5.
Figure 10:
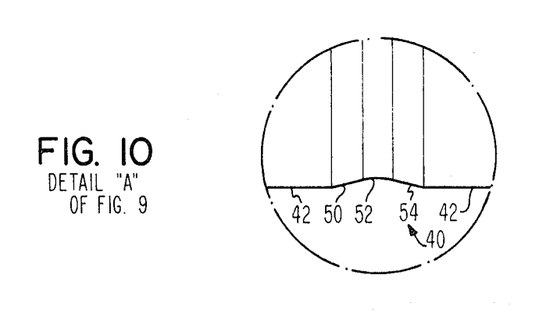
FIG. 10 is a still more detailed view of the region "A" from FIG. 9.

Reference to FIGS. 9 and 10 will illustrate in detail the cam surface 40 for the plunger pin 5. FIG. 10 is a detailed view in the region "A" of FIG. 9, showing the cam surface 40 as being comprised of three separate contours, a first tapered surface 50 and a second tapered surface 54 between the outer cylindrical surface 42 of the plunger pin 5 and a central, recessed surface 52. The recessed surface 52 has a circular contour as seen in the side view of FIG. 10. When the ball bearing 20 is in contact with the recessed surface 52, as is shown in FIG. 3, the radial pin 8 is in its retracted state as is shown in FIG. 6, and is substantially flush with the peripheral surface 26 of the wheel 13. When the ball bearing 20 is in contact with the outer surface 42 of the plunger pin 5, as is shown in FIG. 4, the radial pin 8 is fully extended so that its upper surface 9 is substantially flush with the upper surface 19 of the belt 35, as is shown in FIG. 8.

Figure 11:
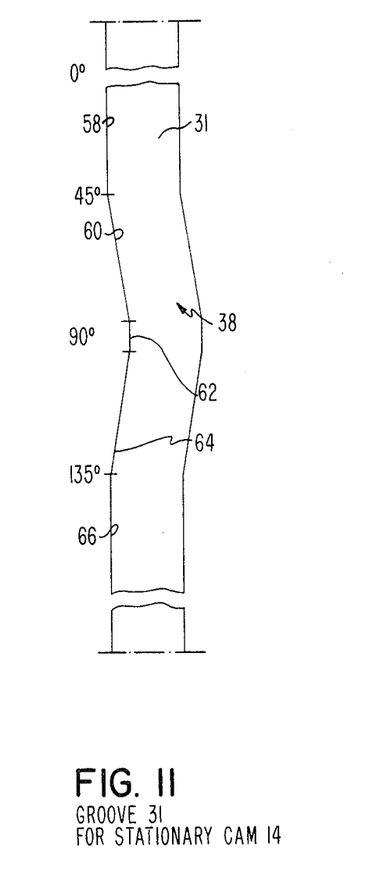
FIG. 11 is a schematic diagram of the shape of the groove 31 for the stationary cam 14.

The cam follower 12 is shown mounted on the transverse axis 56 of the plunger pin 5 and rolls in the groove 31, whose contour is shown in FIG. 11. When a particular cam follower 12 and its corresponding plunger pin 5, ball bearing 20 and radial pin 8 are located at an angular position between θ equals 135 degrees through θ equals 9 degrees to θ equals 45 degrees, the cam follower will be positioned by the groove 31 of the cam 14 as is shown in FIG. 3, so that the radial pin 8 is in its retracted position. In this position there is sufficient clearance between the follower 12 and groove 31 that there is substantially no frictional contact, and of course no movement of plunger pin 5, ball bearing 20 or radial pin 8, resulting in no wear taking place. When the cam follower 12 and its corresponding plunger pin 5, ball bearing 20 and radial pin 8 located at an angular position of θ equals 45 degrees through θ equals 90 degrees to θ equals 135 degrees, the groove 31 for the stationary cam 14 will cause the radial pin 8 to be in some intermediate stage of extending its top surface 9 beyond the peripheral surface 26 of the wheel 13 as is shown in the sequence of FIGS. 6 through 8, culminating in the fully extended state for θ equals 90 degrees, as is shown in FIG. 4.

OPERATION OF THE INVENTION

The mechanism is constructed such that when a drive pin 8 begins to retract and lose positive drive contact with the belt, another pin is in positive contact with the belt. Also, there is a short interval where two drive pins 8 are in simultaneous positive drive contact with the belt.

The amount of wear on the base 36 of the radial pin 8 is significantly reduced over that suffered by extendable drive pins in the prior art, because of the limited time over which motion is imparted by the cam surface 40 and ball bearing 20 on the base 36 of the radial pin 8. Motion in the radial direction 28 for the radial pin 8 is induced by the transverse motion of the plunger pin 5 which occurs during only 60 degrees of each complete revolution of the wheel body 13. The distance traversed by the transverse plunger 5 in progressing from its withdrawn state in FIG. 3 to its extended state in FIG. 4 amounts to 0.080 inches for the example given. Any wear on the surfaces of the ball bearing 20, plunger pin 5, or the base 36 of the radial pin 8 due to the force of the compression spring 9 against the spring retaining washer 13, would occur only due to this limited motion during the 60 degree time interval. Thus, the critical tolerances which must be maintained for the relative position of the top surface 9 of the pin 8 with respect to the peripheral surface 26 of the wheel 13, is maintained by virtue of the reduced wear characteristics of the drive wheel invention, as described above. Furthermore, the follower 12 is engaged by the groove 31 only during the same 60 degree interval so that wear is kept to a minimum. This is important to maintain the critical time when the plunger pin 5 activates the ball bearing 20.

Although a specific embodiment of the invention has been disclosed, it will be understood by those skilled in the art that the foregoing and other changes in form and details may be made therein without departing from the spirit and the scope of the invention. For example, the wheel 1 can be driven by the belt 35 which drives the radial pins 8 engaging the holes 37 in the belt, so that the shaft 21 is driven into rotation by the belt 35. It should be further understood that the drive wheel invention can be used in other applications besides semiconductor chip handling, where precise sequential displacements of a sprocket belt are required. Also, other miniature mechanisms are considered to be within the scope of this invention which provide frictional movement of the parts during only approximately 60 degree rotation of the sprocket wheel, while the parts remain in substantially frictionless engagement during 300 degree rotation of the sprocket wheel.

Having thus described our invention, what we claim as new, and desire to secure by Letters Patent is:

1. A semiconductor chip conveying apparatus including:
    a belt for carrying the chips;
    a drive sprocket wheel for driving the belt, containing a plurality of radially spaced pin openings at the periphery of the wheel;
    a plurality of drive pins, each slideably positioned within a respective one of said pin openings;
    drive means for actuating a pin into driving position while another pin is retracted out of driving position;
    locking means for locking in position the retracted pins and drive means associated with the retracted pins;
    whereby, vibration of the belt and wear of the drive means and pins are kept at a minimum.

2. A semiconductor chip conveying apparatus including:
    a belt having equally spaced openings for carrying chips;
    a drive sprocket wheel for driving the belt, containing a plurality of radially spaced pin openings at the periphery of the wheel;
    a plurality of drive pins, each slideably and retractably positioned within a respective one of said pin openings;
    drive means including plunger means, and cam follower operatively connected to said drive pins;
    said drive means actuating a pin into drive position while another pin is retracted;
    locking means for locking in position the retracted pins and drive means associated with the retracted pins;
    whereby vibration of the belt and wear of the drive means and pins are kept at a minimum.

3. The apparatus of claim 2, which further comprises:
    each of the plurality of drive pins being tapered for a length coinciding with the thickness of the belt.

4. In a miniature semiconductor chip conveying apparatus, having a drive sprocket wheel with reduced wear characteristics, comprising:
    a drive shaft;
    a circular wheel body mounted on the drive shaft for rotating about an axis, having a plurality of radial pin holes each opening onto its periphery in a radial direction and a plurality of transverse holes each intersecting a respective one of said pin holes in a transverse direction;
    a conveyor belt having holes therethrough;
    a plurality of drive pins, each slideably engaged in a respective one of said pin holes, for engaging said holes in said conveyor belt by outward radial displacement at a drive position located with respect to said transverse direction;
    a plurality of transverse plungers, each slideably engaged in a respective one of said transverse holes, and each having a cam surface operatively connected to a corresponding one of said drive pins, for outwardly radially displacing said corresponding drive pins by displacement in said transverse direction when said corresponding drive pin reaches said drive position during the rotation of said wheel.

5. The apparatus of claim 4, which further comprises:
    a plurality of ball bearings, each contacting said cam surface of a respective one of said transverse plungers and contacting the proximate end of a corresponding one of said drive pins, for transmitting said radial displacement of said corresponding drive pin from said respective transverse plunger.

6. The apparatus of claim 4, which further comprises:
    a stationary cam mounted proximate to said drive sprocket wheel, having an actuating contour located with respect to said drive position;
    a plurality of cam followers, each mounted to a respective one of said transverse plungers, and in operative contact with said stationary cam, for following said actuating contour of said stationary cam during said rotation of said wheel and displacing said respective transverse plunger in said transverse direction when said corresponding drive pin reaches said drive position.

7. A drive sprocket wheel with reduced wear characteristics, comprising:
    a drive shaft;
    a circular wheel body mounted on the drive shaft for rotating about an axis, having a plurality of radial pin holes each opening onto its periphery in a radial direction and a plurality of transverse holes each intersecting a respective one of said pin holes in a transverse direction;
    a conveyor belt having holes therethrough;
    a plurality of drive pins, each slideably engaged in a respective one of said pin holes, for engaging said holes in said belt by outward radial displacement at a drive position located with respect to said transverse direction;

a plurality of transverse plungers, each slideably engaged in a respective one of said transverse holes, and each having a cam surface operatively connected to a corresponding one of said drive pins, for outwardly radially displacing said corresponding drive pin by displacement in said transverse direction when said corresponding drive pin reaches said drive position during the rotation of said wheel.

8. The apparatus of claim 7, which further comprises:
a plurality of ball bearings, each contacting said cam surface of a respective one of said transverse plungers and contacting the proximate end of a corresponding one of said drive pins, for transmitting said radial displacement of said corresponding drive pin from said respective transverse plunger.

9. The apparatus of claim 7, which further comprises:
a stationary cam mounted proximate to said drive sprocket wheel, having an actuating contour located with respect to said drive position;
a plurality of cam followers, each mounted to a respective one of said transverse plungers, and in operative contact with said stationary cam, for following said actuating contour of said stationary cam during said rotation of said wheel and displacing said respective transverse plunger in said transverse direction when said corresponding drive pin reaches said drive position.

10. A sprocket wheel with reduced wear characteristics, comprising:
a drive shaft;
a circular wheel body mounted on the shaft for rotating about an axis, having a plurality of radial pin holes each opening onto its periphery in a radial direction and a plurality of transverse holes each intersecting a respective one of said pin holes in a transverse direction;
a conveyor belt having holes therethrough;
a plurality of pins, each slideably engaged in a respective one of said pin holes, for engaging said holes in said belt by outward radial displacement at an engagement position located with respect to said transverse direction;
a cam surface operatively connected to a corresponding one of said pins, for outwardly radially displacing said corresponding pin by displacement in said transverse direction when said corresponding pin reaches said engagement position during the rotation of said wheel;
a plurality of ball bearings, each contacting said cam surface of a respective one of said transverse plungers and contacting the proximate end of a corresponding one of said pins, for transmitting said radial displacement of said corresponding pin from said respective transverse plunger.

11. A sprocket wheel with reduced wear characteristics, comprising:
a drive shaft;
a circular wheel body mounted on the shaft for rotating about an axis, having a plurality of radial pin holes each opening onto its periphery in a radial direction and a plurality of transverse holes each intersecting a respective one of said pin holes in a transverse direction;
a conveyor belt having holes therethrough;
a plurality of pins, each slideably engaged in a respective one of said pin holes, for engaging said holes in said belt by outward radial displacement at an engagement position located with respect to said transverse direction;
a cam surface operatively connected to a corresponding one of said pins, for outwardly radially displacing said corresponding pin by displacement in said transverse direction when said corresponding pin reaches said engagement position during the rotation of said wheel;
a stationary cam mounted proximate to said sprocket wheel, having an actuating contour located with respect to said engagement position;
a plurality of cam followers, each mounted to a respective one of said transverse plungers, and in operative contact with said stationary cam, for following said actuating contour of said stationary cam during said rotation of said wheel and displacing said respective transverse plunger in said transverse direction when said corresponding pin reaches said engagement position.

12. A driven sprocket wheel with reduced wear characteristics, having driven pins along its periphery which sequentially engage holes arranged longitudinally along a driving belt which moves in a longitudinal direction, comprising:
a conveyor belt having holes therethrough;
a driven shaft;
a circular wheel body mounted on the driven shaft for rotating about an axis, having a plurality of radial pin holes each opening onto its periphery in a radial direction and a plurality of transverse holes each intersecting a respective one of said pin holes in a transverse direction;
a plurality of driven pins, each slideably engaged in a respective one of said pin holes, for engaging said holes in said belt by outward radial displacement at a drive position located with respect to said longitudinal direction;
a plurality of transverse plungers, each slideably engaged in a respective one of said transverse holes, and each having a cam surface operatively connected to a corresponding one of said driven pins, for outwardly radially displacing said corresponding driven pin by displacement in said transverse direction when said corresponding driven pin reaches said drive position during the rotation of said wheel.

13. The apparatus of claim 12, which further comprises:
a plurality of ball bearings, each contacting said cam surface of a respective one of said transverse plungers and contacting the proximate end of a corresponding one of said drive pins, for transmitting said radial displacement of said corresponding driven pin from said respective transverse plunger.

14. The apparatus of claim 12, which further comprises:
a stationary cam mounted proximate to said driven sprocket wheel, having an actuating contour located with respect to said drive position;
a plurality of cam followers, each mounted to a respective one of said transverse plungers, and in operative contact with said stationary cam, for following said actuating contour of said stationary cam during said rotation of said wheel and displacing said respective transverse plunger in said transverse direction when said corresponding driven pin reaches said drive position.

* * * * *